June 19, 1962 K. N. WOOD 3,039,501

BRAKE FLUID CAN

Filed Sept. 2, 1958

INVENTOR.
KENNETH N. WOOD
BY

United States Patent Office 3,039,501
Patented June 19, 1962

3,039,501
BRAKE FLUID CAN
Kenneth N. Wood, 6423 Central Ave., Indianapolis, Ind.
Filed Sept. 2, 1958, Ser. No. 758,368
3 Claims. (Cl. 141—352)

This invention relates to a method and apparatus for servicing hydraulic brake systems in automotive vehicles.

It sometimes becomes necessary to service the hydraulic brake system in an automotive vehicle due to the loss of hydraulic fluid from the system, the presence of moisture and other contaminants in the system, and/or the presence of entrapped air in the system. All of these features act to reduce the efficiency of the braking action of a hydraulic system. In servicing such systems it has heretofore been proposed to introduce additional hydraulic fluid into the system from a tank or container which is pressure operated by the excess air pressure in one of the vehicle's tires, an air compressor, or the like. Such practices are effective for filling the system with hydraulic fluid and for bleeding off air entrapped in the system. However, such equipment and procedures have certain disadvantages in that they require accessory equipment to pressurize and propel the additional fluid into the system, and due to the means employed for accomplishing such pressure development moisture and other contaminants are frequently introduced into the system along with the brake fluid.

It is the general object of my invention to provide a method and apparatus for servicing hydraulic brake systems which will overcome the disadvantages and difficulties described above. More specifically, it is an object of my invention to provide a method and apparatus for servicing brake systems which will be simple and inexpensive to use, which will permit the rapid servicing of such systems, and which will prevent the introduction of contaminants into the system during such servicing operations. It is a further object of my invention to provide a method and apparatus for servicing hydraulic brake systems which will flush, bleed, and/or refill such systems as desired, and which will obviate the use of accessory equipment to effect such servicing.

In carrying out my invention in its preferred form, I provide a container of hydraulic fluid pressurized by means of a suitable propellant. Normally closed valve means are mounted on the container to permit the egress of hydraulic fluid from the container during servicing operations, and to prevent contaminants from entering the container when it is not in use. To transfer the hydraulic fluid from the container to a brake system, I provide a hose having a fitting at one of its ends adapted to be connected to the brake system. The opposite end of the hose is provided with another fitting adapted to be received on the normally closed valve means of the container, said fitting upon connection to the valve means on the container opening said valve means to permit the transfer of the hydraulic fluid from the container to the hydraulic system being serviced. Thus, with the several components interconnected as just described, the fluid from the container will be propelled into an automotive hydraulic brake system to fill the voids in said system and place it under a positive pressure. Upon opening of a plurality of bleeder openings at the terminal ends of the system, entrapped air in said system may be removed, and upon continued opening of the bleeder openings all of the fluid in the system will be displaced by the fresh fluid from the container. After the desired servicing operation is completed, the hose is disconnected from the brake system and the container, with the valve means on said container returning to its normally closed position to prevent the escape of the fluid remaining in said container and to prevent contaminants from entering the container.

Conveniently, in order to permit the fluid in the container to be manually introduced into the brake system I further provide a second container having a cover lid provided with a fitting adapted to receive the hose fitting adapted to be interconnected to the brake system so that the contents of the first container may be discharged into said second container from which they can be manually added to a brake system. Said second container is further provided with a hose connection near its bottom to facilitate the transfer of the fluid from said second container into a brake system.

The accompanying drawings illustrate my invention. In such drawings.

Figure 1:
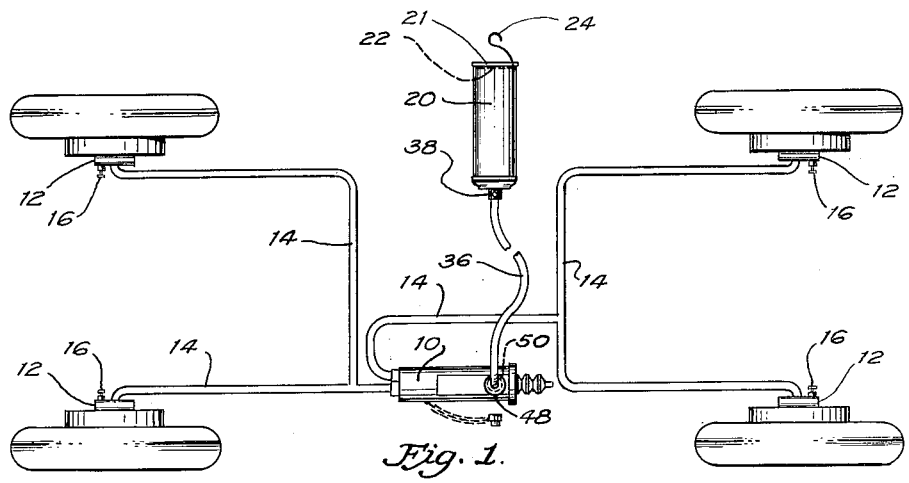
FIG. 1 is a diagrammatic view of an automotive hydraulic brake system being serviced according to my invention.

My invention as illustrated in the drawings is adapted for servicing the hydraulic brake systems of automotive vehicles, such as automobiles, trucks, and the like. Such servicing operations may become necessary to keep the brakes on a vehicle operating at their maximum efficiency, and comprise bleeding off air that may be trapped in the system; flushing out the hydraulic fluid that may be contaminated with moisture, dirt, or other foreign matter; and/or replacing hydraulic fluid that may have been lost through leaks in the system. A typical hydraulic brake system for an automobile is illustrated in FIG. 1, wherein the brake pedal is operatively connected to a master hydraulic cylinder 10. The cylinder 10 is connected by conduits 14 to a plurality of wheel cylinders 12. The wheel cylinders, which are located at the terminal ends of the braking system, are provided with bleeder holes closed by plugs 16 so that upon removing the plugs 16 the fluid in the cylinders 10 and 12 and in the conduits 14 connecting said cylinders may be drained from the system through the bleeder holes in the cylinders 12.

Figures 2, 3:
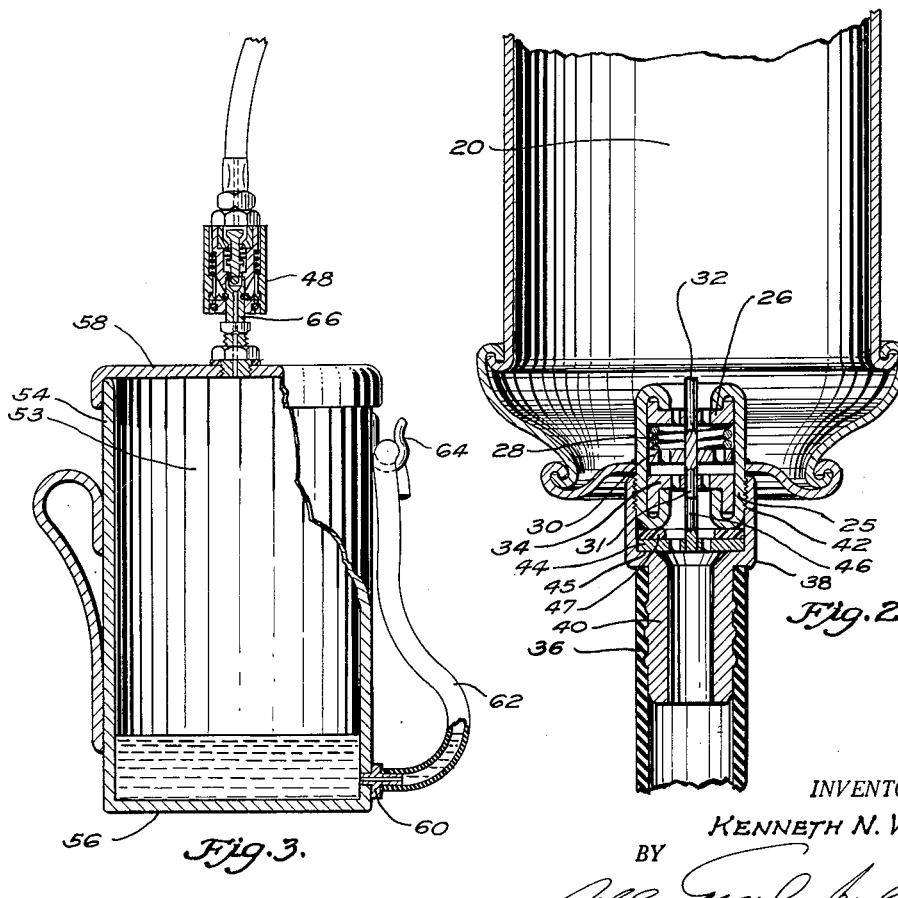
FIG. 2 is a fragmentary sectional view of the self-dispensing brake fluid container shown in FIG. 1.
FIG. 3 is a sectional view of a gravity fill device for adding hydraulic fluid to an automotive hydraulic brake system.

To service such brake systems, I provide a can 20 conveniently formed of metal and adapted to withstand an internal pressure of up to about 120 p.s.i. Conveniently, the side walls of the can extend beyond the bottom thereof to form a rim 21 against which a spring tensioned mounting clip 22 may be retained. The clip 22 is provided with a hooked end 24 which will support the can 20 in an inverted position during servicing of a brake system. As illustrated in FIG. 2, the can is closed by valve means comprising an axially extending sleeve 25 externally threaded at its outer end. A perforated disk 26 is fixedly mounted within the sleeve 25 at its inner end and supports an axially extending coil spring 28. Slidable within the sleeve 25 is a perforated valve 30 having outwardly and inwardly extending stems 31 and 32 respectively. The stem 32 extends axially inwardly through the spring 28 and through an opening in the disk 26, and the stem 31 projects outwardly through an opening in a second perforated disk 34 fixedly mounted in the sleeve 25 and forming a seat for the valve 30. In this manner the two valve stems acting in combination with the disks 26 and 34 maintain valve 30 in operative axially aligned position in both its closed and opened positions and during movements therebetween. The perforations in the valve seat 34 and the valve 30 are out of alignment so that when the valve 30 is forced against the valve seat 34 by means of the spring 28 the can will be tightly sealed to prevent fluid from leaving the can and to prevent moisture and other contaminants from entering the can.

The can is filled with a mixture of conventional hydraulic brake fluid and a compressed gaseous propellant, such as nitrogen, air, or the like, which will not react with the hydraulic fluid. Conveniently, the can contans from about 8 oz. to about 15 oz. of hydraulic brake fluid, an amount sufficient to completely flush out and refill the hydraulic brake system of a single automative vehicle. The propellant pressurizes the hydraulic fluid in the can to a pressure in the range of from about 60 p.s.i. to about 120 p.s.i., so that upon opening of the valve 30 the fluid in the can will be rapidly propelled from the can. Thus, the can provided with its normally closed valve means and containing the pressurized hydraulic fluid constitutes a self-dispensing unit obviating the use of accessory equipment, such as air compressors and the like.

Transfer of the hydraulic brake fluid from the can 20 to the hydraulic brake system of an automotive vehicle is effected by a flexible hose 36 having means at its ends for connection to the can 20 and the master cylinder 10. As illustrated in FIG. 2, the hose is connected to the can 20 by a fitting 38 having a hollow shank 40 received in one end of the hose and a threaded collar 42 receivable on the threaded end of the sleeve 25. Carried within the collar 42 is a perforated valve 44 disposed against a valve seat 45 formed at the base of the collar 42. The valve 44 is provided with a stem 46 engageable with the stem 31 on the valve 30, whereupon tightening of the collar 42 on the sleeve 25 forces the valve 30 inwardly away from its seat 34 to permit the hydraulic fluid in the can to pass through the valve means on said can and the hose fitting 38 under the pressure of the propellant within the can. Conveniently, in order to insure a tight interconnection between the hose and the can I employ a gasket 47 which provides a seal between the valve 44 and the outer face of the sleeve 25.

The opposite end of the hose 36 is provided with a conventional valved "snap-on" coupler 48. The coupler 48 is receivable on a co-operating fitting 50 mountable in the filling opening of the master cylinder 10. Upon interconnection between the coupler 48 and the fitting 50, the valve in the coupler 48 opens so that the hydraulic fluid in the can 20 may pass from said can through the hose 36 and into the master cylinder 10.

In using my invention to flush out and refill an automotive hydraulic brake system, the following sequence of operations are performed: The mounting bracket 22 is secured to the can 20 and is hung in a convenient location near the work area to suspend the can 20 in an inverted position. The hose fitting 38 is mounted on the valve mechanism of the can 20, opening the valve 30 to permit the hydraulic fluid under the pressure of the propellant to leave said can and fill the hose 36. The plug closing the master cylinder filling opening is replaced by the fitting 50, and the coupler 48 is connected to the fitting 50, with the valve means in said coupler opening upon such connection to permit the hydraulic fluid in the can 20 and the hose 36 to be discharged into the master cylinder 10. The fresh hydraulic fluid entering the system from the can 10 forces the old fluid (the fluid previously in the system) through the conduits 14 toward the wheel cylinders 12 under the pressure of the propellant. With all of the hydraulic fluid in the system now under a positive pressure, the plugs 16 in the bleeder holes in the several wheel cylinders 12 are removed to permit the old hydraulic fluid to be discharged from the system through the bleeder holes. Thus, as the old hydraulic fluid leaves the system it is replaced by the hydraulic fluid from the can 20 and the system is completely filled with the new fluid. After the old fluid has been flushed from the system and replaced by the fluid from the can 20, the bleeder holes are closed with the plugs 16. The fitting 50 is then removed from the master cylinder 10 and the filling opening in said cylinder is closed by the filling opening plug. Upon disconnection of the hose fitting 38 and the valve sleeve 25 on the can, the valve 30 will close under the action of the spring 28 to seal the can and prevent any material from entering or leaving the can.

When it is merely desired to bleed trapped air from the system, the bleeder holes on the wheel cylinders 12 are opened for only a sufficient length of time to permit the fluid containing the trapped air to be removed from the system. Similarly, where it is merely desired to replace the hydraulic fluid in the system that has been lost through leakage, the bleeder holes remain closed and a sufficient amount of fluid is introduced into the master cylinder from the can 20 to fill said cylinder.

It frequently occurs that after any of the servicing operations previously described a slight excess of hydraulic brake fluid will remain in the can 20. In order that this excess fluid may be discharged into another vessel so that it may be manually added to a hydraulic system as by gravity filling, I provide a vessel 53 of the type illustrated in FIG. 3. Conveniently, such a vessel comprises cylindrical side walls 54, a bottom 56, and a removable cover lid 58. An outlet 60 mounted near the bottom of the can is connected to a flexible hose 62 conveniently carried in a clip 64 on the side of the vessel when it is not in use. The lid 58 is provided with a fitting 66 identical with the fitting 50 for connection to the coupler 48 to permit the excess hydraulic fluid in the can 20 to be discharged into the vessel 53. The fluid in the vessel may then be added to the master cylinder by simply removing the plug in the filling opening in said cylinder and draining the contents of the vessel into the master cylinder. This feature of my invention constitutes an additional means for a service operator to add fluid to a hydraulic brake system in the event that for any reason he does not desire to interconnect the pressurized can 20 directly to said system.

The term master cylinder as used herein includes the master cylinder and its attached hydraulic fluid reservoir, and in most instances my device will be connected to said fluid reservoir forming a part of the master cylinder.

I claim as my invention:

1. An apparatus for servicing an automotive hydraulic brake system of the type employing a master cylinder and a plurality of wheel cylinders interconnected thereto, comprising a container having a precharged mixture of hydraulic brake fluid and a gaseous propellant pressurizing said fluid to a pressure in the range of from about 60 p.s.i. to about 120 p.s.i. for propelling said fluid from the container, a valve at one end of said container, said valve having a valve disk normally disposed against a valve seat for closing said container and movable with respect to said valve seat to open said container for charging said container with said fluid and propellant and for permitting said fluid to be discharged from said container, and a hose for transferring hydraulic fluid from the container to the hydraulic brake system and having fittings at its ends for connection to the master cylinder and to the normally closed valve on the container, the fitting at the end of said hose connected to the container valve having means operatively engageable with said valve disk to open said valve upon connection thereto to permit the fluid in the container to be propelled therefrom through the hose into the hydraulic brake system being serviced.

2. An apparatus for servicing an automotive hydraulic brake system of the type employing a master cylinder and a plurality of wheel cylinders interconnected thereto, comprising a container having a precharged mixture of hydraulic brake fluid and a gaseous propellant adapted to propel said fluid from the container, a valve at one end of said container, said valve having a valve disk normally disposed against a valve seat for closing said container and movable with respect to said seat to open said container for charging said container with said fluid and propellant and for permitting said fluid to be discharged from said container, and a hose for transferring hydraulic fluid from the container to the hydraulic brake system and having fittings at its ends for connection to the master cylinder and to the normally closed valve on the container, the fitting on said hose adapted to be connected to the master cylinder having a normally closed valve openable upon connection to the master cylinder and the fitting on the hose adapted to be connected to the container valve having means operatively engageable with said valve disk to open said valve upon connection thereto, thereby permitting the fluid in the container to be propelled therefrom through the hose into the hydraulic brake system being serviced.

3. An apparatus for servicing an automotive hydraulic brake system of the type employing a master cylinder and a plurality of wheel cylinders interconnected thereto, comprising a container having a precharged mixture of hydraulic brake fluid and a gaseous propellant adapted to propel said fluid from the container, normally closed valve means at one end of said container, said valve means being provided with a sleeve projecting outwardly from said container, a pair of valve seats having openings formed therein and disposed within said sleeve, a valve member movable within said sleeve and having a disk provided with a plurality of openings disposed out of alignment with the openings in said valve seats, a valve stem projecting outwardly from said disk through said valve seats, biasing means urging said valve disk against one of said seats, and a hose for transferring hydraulic fluid from the container to a hydraulic brake system and having means at one of its ends for connection to the master cylinder of said system and a fitting at its opposite end receivable on the sleeve of the container, said fitting carrying a valve having a stem engageable with the valve stem in said container valve means to move the valve disk out of engagement with said valve seats to open the valve on said container to permit the fluid in the container to be propelled therefrom through the hose into the hydraulic brake system being serviced.

References Cited in the file of this patent

UNITED STATES PATENTS

| | | |
|---|---|---|
| 284,408 | Garland | Sept. 4, 1883 |
| 883,679 | Anderson | Mar. 31, 1908 |
| 2,295,539 | Beach | Sept. 15, 1942 |
| 2,509,570 | Lee | May 30, 1950 |
| 2,660,132 | Pyenson | Nov. 24, 1953 |
| 2,670,874 | Wilkerson | Mar. 2, 1954 |
| 2,735,589 | Milster et al. | Feb. 21, 1956 |